(12) United States Patent
Lesso

(10) Patent No.: US 11,574,176 B2
(45) Date of Patent: Feb. 7, 2023

(54) ARTIFICIAL NEURAL NETWORKS

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 460 days.

(21) Appl. No.: 16/788,737

(22) Filed: Feb. 12, 2020

(65) Prior Publication Data

US 2020/0327402 A1 Oct. 15, 2020

Related U.S. Application Data

(60) Provisional application No. 62/831,301, filed on Apr. 9, 2019.

(51) Int. Cl.
*G06N 3/063* (2006.01)
*G06N 3/04* (2006.01)
*G06F 17/16* (2006.01)

(52) U.S. Cl.
CPC .......... *G06N 3/0635* (2013.01); *G06F 17/16* (2013.01); *G06N 3/04* (2013.01)

(58) Field of Classification Search
CPC ...... G06N 3/0635; G06N 3/04; G06N 3/0481; G06N 3/08; G06F 17/16
See application file for complete search history.

(56) References Cited

U.S. PATENT DOCUMENTS

| | | | | |
|---|---|---|---|---|
| 5,299,285 A | * | 3/1994 | Tawel | G06N 3/0635 706/27 |
| 2005/0174274 A1 | * | 8/2005 | Delanghe | H03M 1/183 341/139 |
| 2006/0034447 A1 | * | 2/2006 | Alves | H04M 9/082 379/406.01 |
| 2007/0003078 A1 | * | 1/2007 | Escort | H03G 7/007 381/107 |
| 2010/0007414 A1 | * | 1/2010 | Searle | H03F 1/30 330/127 |
| 2017/0364752 A1 | * | 12/2017 | Zhou | H04N 13/161 |
| 2019/0311290 A1 | * | 10/2019 | Huang | G01R 31/317 |
| 2020/0005125 A1 | * | 1/2020 | Venkataramani | G06N 3/0481 |

* cited by examiner

Primary Examiner — Farley Abad
(74) Attorney, Agent, or Firm — Jackson Walker L.L.P.

(57) ABSTRACT

The present disclosure relates to a neuron for an artificial neural network. The neuron comprises a dot product engine operative to: receive a set of weights; receive a set of data inputs based on a set of input data signals; and calculate the dot product of the set of data inputs and the set of weights to generate a dot product engine output. The neuron further comprises an activation function module arranged to apply an activation function to a signal indicative of the dot product engine output to generate a neuron output; and gain control circuitry. The gain control circuitry is operative to control: an input gain applied to the input data signals to generate the set of data inputs; and an output gain applied to the dot product engine output or by the activation function module. The output gain is selected to compensate for the applied input gain.

19 Claims, 5 Drawing Sheets

ARTIFICIAL NEURAL NETWORKS

FIELD OF THE INVENTION

The present disclosure relates to the field of artificial neural networks.

BACKGROUND

In simplistic terms, an artificial neural network includes an input layer of nodes or neurons, an output layer of nodes or neurons and, optionally, one or more layers (often referred to as "hidden layers") of nodes or neurons intermediate the input layer and the output layer. Each layer is connected to its successor layer by connections between the nodes of the layers that transfer data from a node of a layer to a node of the successor layer.

Each node or neuron of a layer typically has multiple inputs, and a weight is assigned to each input of each node in a learning or training stage. During this learning or training stage, known training data is supplied to a layer of the neural network and individual neurons of the layer assign weights to their inputs based on the task being performed. By comparing the resultant outputs with the known training data, and repeating over a series of iterations, the neural network learns the optimum weights to assign to the inputs of the neurons for the task being performed.

During subsequent use of the neural network, operational input data is supplied to the input layer of the neural network. Data applied to a neuron of the input layer is weighted according to the weights assigned to the inputs of the neuron—i.e. the neuron applies the weight assigned to each of its inputs to the data received at the respective inputs. The neuron sums the weighted input data and performs a non-linear activation function on the sum of the weighted input data to generate an output data value, which is transmitted to one or more neurons of the next layer of the neural network, which may be an output layer or an intermediate layer. The use of a trained neural network to apply weights to operational input data is known as inference.

Traditionally the training and inference stages have been performed by centralised servers or "in the cloud", receiving inputs from and providing resultant outputs to so-called "edge" devices, e.g. mobile phones, tablet computers, "smart" devices etc. However, increasingly there is a drive to provide neural nets for inference locally in such devices, which may receive trained weights from training processes performed remotely.

In addition, inference systems are increasingly intended for use in always-on applications, e.g. always-on audio monitoring or image processing systems.

Additionally, there is increasing interest in on-device learning, in which an edge device receives a current neural net model from a provider and performs additional training of the received model itself, using data stored locally on the edge device.

The trend towards providing local neural nets and inference systems within edge devices is driving requirements for increased flexibility in such neural networks and inference systems.

SUMMARY

According to a first aspect, the invention provides a neuron for an artificial neural network, the neuron comprising: a dot product engine operative to: receive a set of weights; receive a set of data inputs based on a set of input data signals; and calculate the dot product of the set of data inputs and the set of weights to generate a dot product engine output;
an activation function module arranged to apply an activation function to a signal indicative of the dot product engine output to generate a neuron output; and
gain control circuitry operative to control:
an input gain applied to the input data signals to generate the set of data inputs; and
an output gain applied to the dot product engine output or by the activation function module;
wherein the output gain is selected to compensate for the applied input gain.

The neuron may further comprise: a controllable input gain unit operative to receive the set of input data signals and to output the set of data inputs to the dot product engine, wherein the gain control circuitry is operative to control a gain of the controllable gain unit.

The controllable input gain unit may comprise a binary shift unit, for example.

The dot product engine may be an analog dot product engine and the neuron may further comprise a set of digital to analog converters (DACs), each DAC having an input coupled to an output of the controllable gain unit and an input coupled to a data input terminal of the dot product engine.

The gain control circuitry may be operative to control a gain of the set of DACs.

The neuron may further comprise an analog to digital converter (ADC) coupled between an output of the dot product engine and an input of the activation function module.

Alternatively, the activation function module may be coupled to an output of the dot product engine, and the neuron may further comprise an analog to digital converter (ADC) coupled to an output of the activation function module.

The gain control circuitry may be operative to control the input gain and the output gain based at least in part on a value of one or more of the input data signals.

For example, the gain control circuitry may be operative to: compare a value of an input data signal to a first threshold; and if the value of the input data signal meets or exceeds the threshold, apply an input gain reduction to one or more of the input data signals.

Additionally or alternatively the gain control circuitry may be operative to: compare a value of an input data signal to a second threshold; and if the value of the input data signal is below the second threshold, apply an input gain increase to one or more of the input data signals.

Additionally or alternatively the gain control circuitry may be operative to control the input gain and the output gain based at least in part on a value of the dot product engine output.

For example, the gain control circuitry may be operative to: compare the value of the dot product engine output to a third threshold; and if the value of the dot product engine output meets or exceeds the threshold: if no input gain has been applied to the one or more of the input data signals, apply an input gain reduction to one or more of the input data signals; or if an input gain has been applied to the one or more of the input data signals, reduce the value of the input gain applied to the one or more input data signals.

Additionally or alternatively the gain control circuitry may be operative to control the input gain and the output gain based at least in part on the output of the ADC.

For example, the gain control circuitry may be operative to: compare the value of the output of the ADC to a third threshold; and if the value of the output of the ADC meets or exceeds the threshold: if no input gain has been applied to the one or more of the input data signals, apply an input gain reduction to one or more of the input data signals; or if an input gain has been applied to the one or more of the input data signals, reduce the value of the input gain applied to the one or more input data signals.

The gain control circuitry may be operative to receive a tuning factor and to control the gain applied to each of the input data signals based in part on the received tuning factor.

The neuron may be operative to apply a bias signal to the signal indicative of the dot product engine output, and to apply a gain corresponding to the input gain to the bias signal.

According to a second aspect of the invention there is provided an integrated circuit comprising a neuron according to the first aspect.

According to a third aspect of the invention there is provided a device comprising an integrated circuit according to the second aspect.

The device may be a mobile telephone, a tablet or laptop computer or an Internet of Things (IoT) device, for example.

According to a fourth aspect of the invention there is provided a neuron for an artificial neural network, the neuron comprising: a dot product engine operative to: receive a set of weights; receive a set of data inputs based on a set of input data signals; and calculate the dot product of the set of data inputs and the set of weights to generate a dot product engine output; an activation function module arranged to apply an activation function to a signal indicative of the dot product engine output to generate a neuron output; and a controllable input gain unit operative to apply an input gain to the input data signals to generate the set of data inputs, wherein the activation function module is operative to apply an output gain, the output gain being selected to compensate for the applied input gain.

According to a fifth aspect of the invention there is provided an artificial neural network (ANN) system comprising a plurality of neurons, each neuron comprising:
  a dot product engine operative to:
    receive a set of weights;
    receive a set of data inputs based on a set of input data signals; and
    calculate the dot product of the set of data inputs and the set of weights to generate a dot product engine output; and
  an activation function module arranged to apply an activation function to a signal indicative of the dot product engine output to generate a neuron output,
  wherein the ANN system further comprises gain control circuitry operative to control:
    an input gain applied to a set of input data signals for a neuron to generate the set of data inputs for the dot product engine of that neuron; and
    an output gain applied to the dot product engine output or by the activation function module of that neuron,
  wherein the output gain is selected to compensate for the applied input gain.

According to a sixth aspect of the invention there is provided an integrated circuit comprising an ANN system according to the fifth aspect.

According to a seventh aspect of the invention there is provided a device comprising an integrated circuit according to the sixth aspect.

The device may be a mobile telephone, a tablet or laptop computer or an Internet of Things (IoT) device, for example.

BRIEF DESCRIPTION OF THE DRAWINGS

Embodiments of the invention will now be described, strictly by way of example only, with reference to the accompanying drawings, of which.

DETAILED DESCRIPTION

Figure 1:
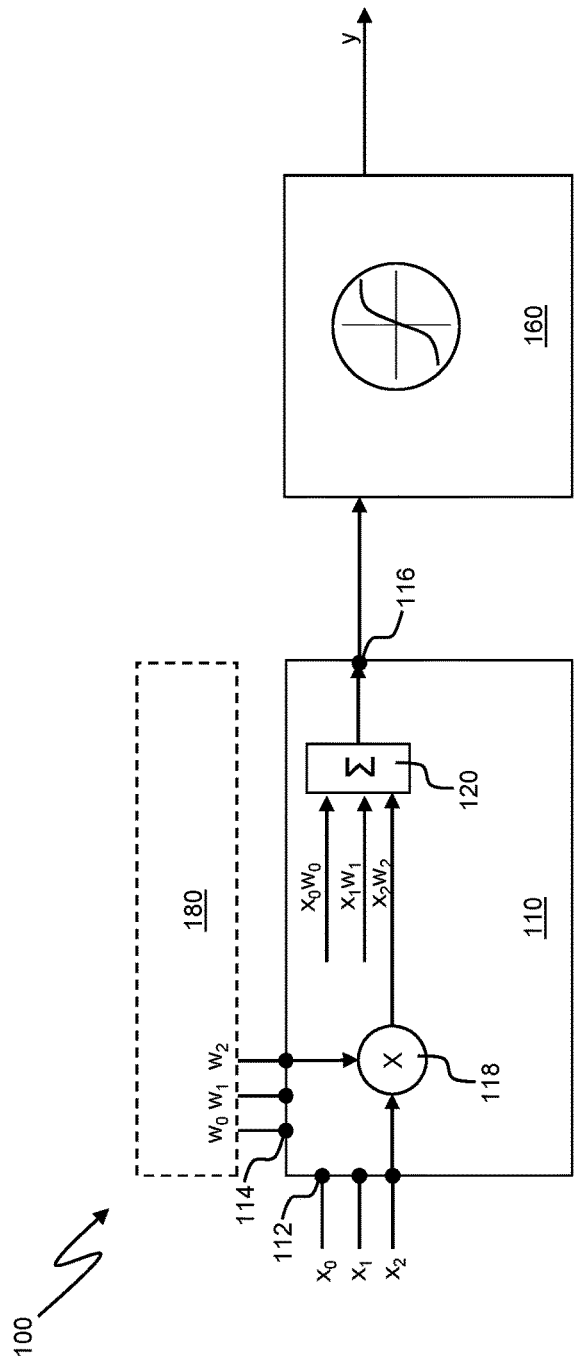
FIG. 1 is a simplified schematic representation of a neuron for an artificial neural network.

Referring first to FIG. 1, a neuron for an artificial neural network (ANN) is shown generally at 100, and comprises a dot product engine 110 and an activation function unit 160.

A neuron of a neural network can be modelled, in part, by a vector multiplication operation, multiplying a vector of input values (representing the inputs to the neuron) by a vector of weights or coefficients (representing the weights applied by the neuron to its inputs) to generate an intermediate output value (representing the sum of the results of the multiplication of each input value with the corresponding weight value, i.e. the dot product of the input vector and the weight vector). This intermediate output value is then subjected to an activation function to provide the neuron output.

The dot product engine 110 of FIG. 1 is configured to calculate the dot product of a plurality (in this example three) of input signals and a plurality (in this example three) of weight signals, by multiplying each input with a corresponding weight and summing the results of the multiplication to generate a single output value. Thus the dot product engine implements part of the functionality of a neuron of a neural network.

To this end, the dot product engine 110 has a plurality of parallel data input terminals 112 for receiving input data signals, a plurality of weight input terminals 114 for receiving weight data signals, and a data output terminal 116 for outputting a result of a calculation of the dot product of the input data signals and the weight data signals.

The dot product engine 110 further includes a plurality of computation elements 118 (of which, for the sake of clarity, only one is shown in FIG. 1) and a summation unit 120. The computation elements 118 may be digital computation elements or analog computation elements. In the case where the computation elements 118 are digital computation elements, the dot product engine 110 may be referred to as a digital dot product engine, whereas if the computation elements 118 are analog computation elements the dot product engine 110 may be referred to as an analog dot product engine.

In one example, the computation elements 118 may be based on memristors, in which case the weight data signals received by the dot product engine 110 via the weight input terminals 114 may be, for example, signals (e.g. current pulses) that are used to program the computation elements 118 with weight data. The memristors may be based on MRAM (Magnetoresistive Random Access Memory) technology or ReRAM (Resistive Random Access Memory)

technology. Alternatively, the computation elements may comprise other forms of non-volatile analog memory elements, for example based on floating-gate structures, or may comprise non-volatile digital memory elements used to digitally configure analog elements, for example the values of switched capacitors or the value of current sources.

Where the computation elements 118 are digital computation elements, the weight data signals may be received from a memory 180, external to the dot product engine 110, which stores weight values, though the weight data may also be stored locally in the digital computation element.

In use of the system 100, input data signals $x_0$, $x_1$, $x_2$ are received at the data input terminals 112 of the dot product engine 110. A computation element 118 of the dot product engine 110 multiplies each received input signal $x_0$, $x_1$, $x_2$ with a corresponding weight $w_0$, $w_1$, $w_2$ and outputs an output signal representing the result of the multiplication to the summation unit 120. For example, as shown in FIG. 1, a computation element 118 of the dot product engine 110 calculates the product of input signal $x_2$ and weight $w_2$ and outputs a signal representing the result $x_2w_2$ of this multiplication to the summation unit 120.

The summation unit 120 sums the results $x_0w_0$, $x_1w_1$, $x_2w_2$ of the multiplication operations performed by the computation elements 118 and outputs a dot product output signal representing the sum of the multiplication operations to the non-linear activation function 160, via the output terminal 116 of the dot product engine 110.

The non-linear activation function 160 performs a non-linear activation function on the dot product output signal. For example, the non-linear activation function unit 160 may compare the magnitude of the dot product output signal to a threshold, and output an output signal y having a magnitude equal to that of the dot product output signal if the magnitude of the dot product output signal meets or exceeds the threshold. If the magnitude of the dot product output signal is below the threshold, the non-linear activation function unit 160 may output a zero or a signal having some other constant magnitude. It will be understood that this is a simple example of a non-linear activation function, and that alternative non-linear functions may be used as required by the particular circumstances and application of the net in which the neuron 100 is used. For example, the non-linear activation function may include or be based on a non-linear function such as a cube, square, ReLU, sigmoid, tan h. Other suitable non-linear functions will be familiar to those skilled in the art.

As discussed above, the dot product engine 110 of FIG. 1 is configured to implement the multiplication of an input vector X by a weight vector W to generate an output vector Y, i.e. the dot product engine 110 implements the vector calculation $Y=W \cdot X$.

The neuron 100 described above with reference to FIG. 1 implements a single vector dot product (VDP) operation, whose output is subject to a non-linear activation function. As discussed above, an artificial neural network includes at least two layers, each layer typically comprising a plurality of neurons. An ANN or a layer of an ANN can be implemented using a plurality of neurons 100, as will now be described with reference to FIG. 2.

Figure 2:
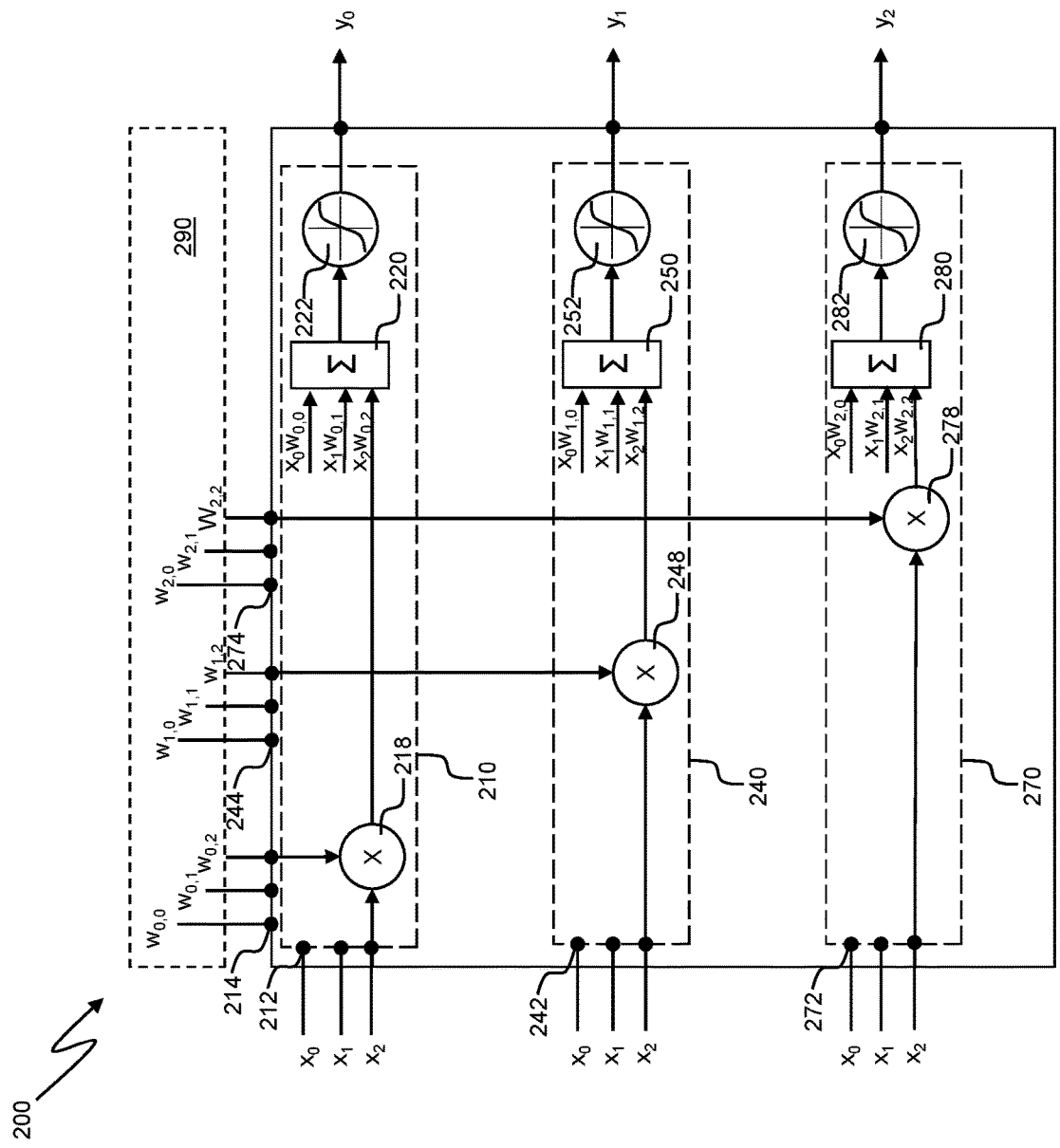
FIG. 2 is a simplified schematic representation of an artificial neural network system including a plurality of neurons.

A typical artificial neural network system will include a plurality of neurons 100. FIG. 2 is a schematic representation of an ANN system including a plurality of neurons 100. The example ANN system 200 illustrated in FIG. 2 includes a first neuron 210, a second neuron 240 and a third neuron 270, each of which includes a dot product engine and an activation function unit.

Thus, each neuron 210, 240, 270 includes a respective plurality of computation elements 218, 248, 278 (of which, for the sake of clarity, only one is shown for each neuron in FIG. 2) and a respective summation unit 220, 250, 280. The computation elements 228, 248, 278 may be digital computation elements or analog computation elements as described above.

Each neuron 210, 240, 270 also includes a summation unit 220, 250, 280 and an activation function unit 222, 252, 282. The computation elements 218 and summation unit 220 of the first neuron 210 together form a dot product engine of the first neuron 210. Similarly, the computation elements 248 and summation unit 250 of the second neuron 240 together form a dot product engine of the second neuron 240, and the computation elements 278 and summation unit 280 of the third neuron 270 together form a dot product engine of the third neuron 270.

In use of the ANN system 200, input data signals $x_0$, $x_1$, $x_2$ are received at respective data input terminals 212, 242, 272 of each neuron 210, 240, 270. Weight data signals $w_{0,0}$, $w_{0,1}$, $w_{0,2}$ are received at weight data terminals 214 of the first neuron 210, weight data signals $w_{1,0}$, $w_{1,1}$, $w_{1,2}$ are received at weight data terminals 244 of the second neuron 240, and weight data signals $w_{2,0}$, $w_{2,1}$, $w_{2,2}$ are received at weight data terminals 274 of the third neuron 270. Thus, each neuron 210, 240, 270 receives the same input data signals, but receives different weight data signals. The weight data signals may be received from a memory 290, external to the neurons 210, 240, 270, which stores weight values.

The computation elements 218 of the first neuron 210 multiply each received input signal $x_0$, $x_1$, $x_2$ with a corresponding weight $w_{0,0}$, $w_{0,1}$, $w_{0,2}$ and provide an output signal representing the result of the multiplication to the summation unit 220 of the first neuron 210. The summation unit 220 sums the results $x_0w_{0,0}$, $x_1w_{0,1}$, $x_2w_{0,2}$ of the multiplication operations performed by the computation elements 228 and outputs a dot product output signal representing the sum of the multiplication operations to the activation function unit 222, which applies an activation function to the received dot product output signal as described above. Thus, the dot product engine of the first neuron 210 calculates the product of each input signal $x_0$, $x_1$, $x_2$ and the corresponding weight $w_{0,0}$, $w_{0,1}$, $w_{0,2}$ and sums the calculated products to generate a dot product output.

Similarly, the computation elements 248 of the second neuron 240 multiply each received input signal $x_0$, $x_1$, $x_2$ with a corresponding weight $w_{1,0}$, $w_{1,1}$, $w_{1,2}$ and output an output signal representing the result of the multiplication to the summation unit 250 of the second neuron 240. The summation unit 250 sums the results $x_0w_{1,0}$, $x_1w_{1,1}$, $x_2w_{1,2}$ of the multiplication operations performed by the computation elements 248 and outputs a dot product output signal representing the sum of the multiplication operations to the activation function unit 252, which applies an activation function to the received dot product output signal as described above. Thus, the dot product engine of the second neuron 240 calculates the product of each input signal $x_0$, $x_1$, $x_2$ and the corresponding weight $w_{1,0}$, $w_{1,1}$, $w_{1,2}$ and sums the calculated products to generate a dot product output.

Similarly, the computation elements 278 of the third neuron 270 multiply each received input signal $x_0$, $x_1$, $x_2$ with a corresponding weight $w_{2,0}$, $w_{2,1}$, $w_{2,2}$ and output an output signal representing the result of the multiplication to the summation unit 280 of the third neuron 270. The summation unit 280 sums the results $x_0w_{2,0}$, $x_1w_{2,1}$, $x_2w_{2,2}$ of the multiplication operations performed by the computation elements 278 and outputs a dot product output signal representing the sum of the multiplication operations to the activation function unit 282, which applies an activation function to the received dot product output signal as described above. Thus, the dot product engine of the third neuron 270 calculates the product of each input signal $x_0$, $x_1$, $x_2$ and the corresponding weight $w_{2,0}$, $w_{2,1}$, $w_{2,2}$ and sums the calculated products to generate a dot product output.

Thus, each neuron 210, 240, 270 of the ANN system 200 implements the multiplication of a common input vector X by a different row of a weight matrix W to generate an output vector Y, i.e. the ANN system 200 implements the vector-matrix calculation $Y=W \cdot X$.

More generally, it can be said that the dot product engines of the neurons 210, 240, 270 collectively perform a tensor multiplication $V=WX$ of an input tensor X with a tensor W to generate an output tensor V, and that the activation function units of the neurons 210, 240, 270 collectively output a tensor Y of neuron output values.

Figure 3:
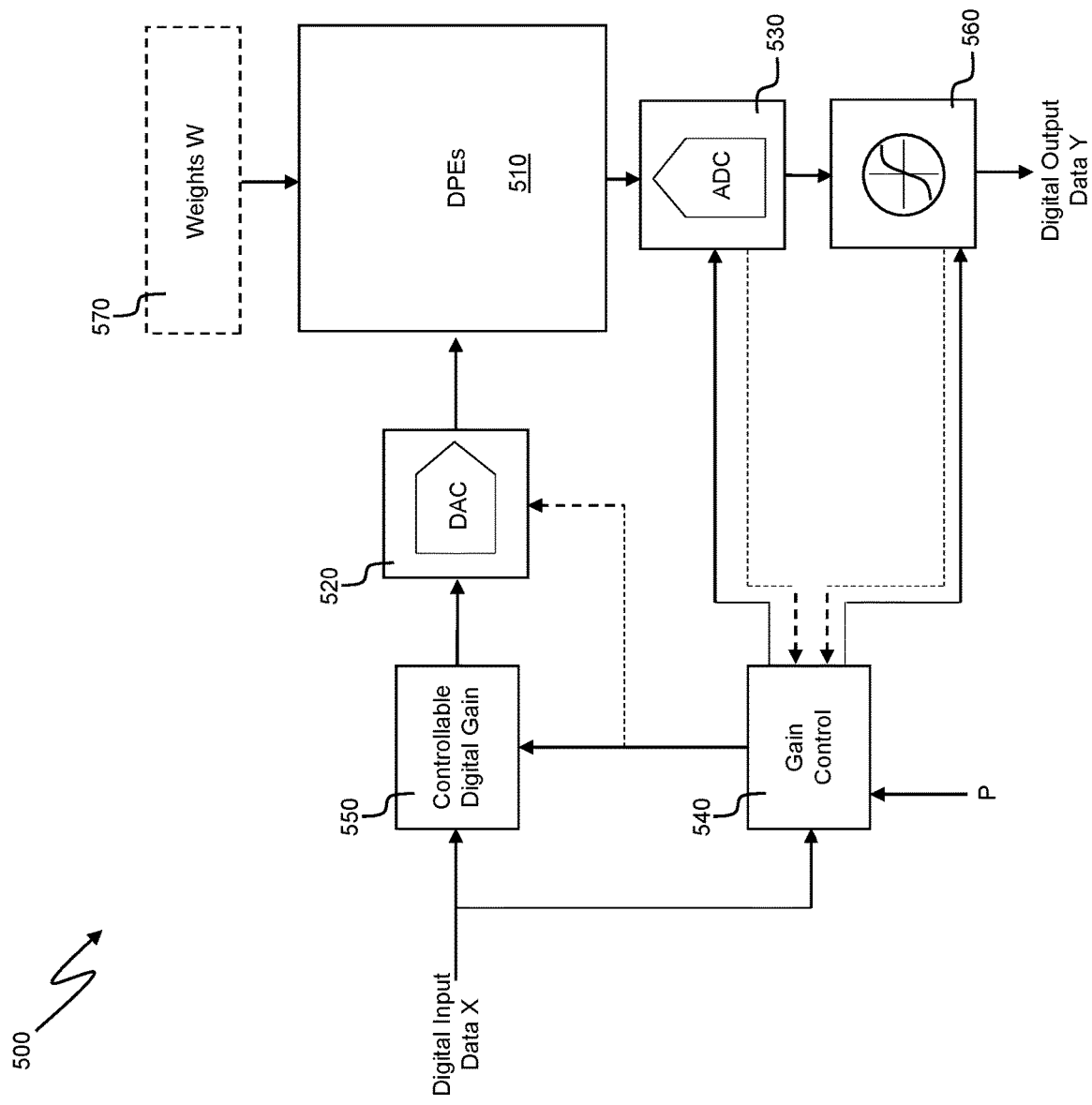
FIG. 3 is a schematic representation of an alternative artificial neural network (ANN) system.

FIG. 3 is a schematic representation of an ANN system that can implement scaling of digital data input values, in order to at least partially mitigate problems associated with saturation and clipping and with small digital data input signal values, as will be discussed below. The ANN system, shown generally at 500 in FIG. 3, may implement a single neuron, or may implement a plurality of neurons.

The ANN system 500 includes (where the ANN system 500 implements a single neuron) an analog dot product engine 510 or (where the ANN system 500 implements a plurality of neurons) a plurality of analog dot product engines 510 of the kind described above with reference to FIG. 1. Each of the dot product engines is operative to calculate the dot product of a respective subset of weights (derived from a larger set W of weights, which may be stored in a memory 570, or which may be programmed into the dot product engines, e.g. by applying appropriate current pulses to memristive elements of the dot product engines 510 to program them with the weights) and a respective subset of input data values (derived from a larger set X of input data values), as described above.

As the dot product engines 510 in this embodiment are analog, the ANN system 500 includes a digital to analog converter (DAC) unit 520 including a plurality of DACs, operative to convert digital input data signals into analog input data signals that can be used by the dot product engines 510. The ANN system also includes an analog to digital converter (ADC) unit 530. If the ANN system 500 comprises a single neuron, the ADC unit 530 comprises a single ADC, operative to convert an analog dot product output signal output by a dot product engine 510 into a digital signal, whereas if the ANN system comprises a plurality of neurons, the ADC stage 530 includes a plurality of ADCs, operative to convert analog dot product output signals output by the dot produce engines 510 into digital signals. The digital signal(s) output by the ADC stage 530 are received by an activation function unit 560, which is configured to perform a non-linear activation function on the or each received ADC output signal to generate an output signal, such that the activation function unit 560 generates a set Y of one or more digital ANN system output signals.

In some circumstances the dynamic range of the digital input data signals may be greater than the input operating range of the DACs of the DAC unit 520. For example, the digital input data signals may be, say, 12-bit digital signals, whereas the input operating range of the DACs of the DAC unit 520 may be, say, 8 bits. In such a situation the maximum digital input signal value that can accurately be converted into an analog output signal by the DACs of the DAC unit 520 is 255, as the DACs will saturate at input values exceeding this value, causing clipping to occur as the DACs output their maximum signal value for any input signal having a value equal to or greater than 255.

In order to control the degree of clipping applied by the DACs of the DAC unit 520, the ANN system 500 includes a gain control unit 540, which is operative to receive a set of digital input data signals representing the set X of input data values and to control an input gain applied to the input digital data signals based at least in part on the values of the digital input data signals.

The input gain may be applied to the digital input data signals by a controllable digital gain unit 550, which may comprise, for example, a binary shift unit operative to apply the input gain to the input digital data signals by performing one or more binary left shift operations on the input digital data signals. Alternatively or additionally, the input gain (or at least part of the input gain) may be applied by the DACs of the DAC unit 520. For example the effective conversion gain of the DAC may be controlled by altering a value of a reference voltage or current used by the DAC, or the analogue output may be scaled by an active or passive gain stage. The term DAC should be understood to include the possibility that the DAC comprises a PWM modulator, whose gain may be controlled by the slew rate of an applied voltage ramp or current ramp reference or by the frequency of a clock used to define the width of output pulses.

The gain control unit 540 may thus monitor the digital input data signals. If a digital input data signal for a neuron of the ANN system 500 having a value that could cause clipping is detected, e.g. if the value of a digital input data signal meets or exceeds a first threshold, the gain control unit 540 may control the input gain applied to the digital input data signals for the neuron by the controllable gain unit 550 and/or the DAC unit 520 so as to reduce the gain applied in the path to the input of the dot product engine, for example by applying an input gain of less than 1 to those digital input data signals such that the values of gain adjusted signals output by the controllable digital gain unit 550 are within the input operating range of the DACs of the DAC unit 520.

The gain control unit 540 is operative to control the input gain applied by the controllable gain unit 550 and/or the DAC unit 520 so as to apply a common input gain to all of the digital input data signals for a neuron if the value of any of the digital input data signals for that neuron is such that clipping could occur. It is to be understood that whilst a common gain is applied to all of the digital input data signals for a particular neuron, a different gain may be applied to the digital input data signals for a different neuron.

In some circumstances the range of the digital data signals may be less than the input operating range of the DACs of the DAC unit 520. For example, the digital input data signals may be small signals which use only the three least significant bits of a 12-bit range, whereas the input operating range of the DACs of the DAC unit 520 may be, say, 8 bits. In such a situation noise in the signal path between the nodes that receive the digital input data signals and the outputs of the DACs of the DAC unit 520 (including, for example, quantisation noise, thermal noise, flicker noise, random telegraph noise, power supply noise, substrate noise, interference and the like) may adversely affect the accuracy of the digital to analog conversion, whilst noise in the signal path between the nodes that receive the digital input data signals and the outputs of the dot product engines 510 may adversely affect the accuracy of dot product calculations.

In such circumstances the gain control unit 540 may be operative to control the gain of the controllable gain unit 550 and/or the DAC unit 520 so as to apply a gain greater than 1 to the digital input data signals, such that the value of the gain adjusted signal(s) output by the controllable gain unit 550 and/or the DAC unit 520 occupies the whole of, or at least a larger portion of, the input operating range of the DACs of the DAC unit 520.

Where a gain reduction (e.g. an input gain less than 1) has been applied to the digital input data signals a corresponding gain increase should be applied to the signals output by the plurality of dot product engines 510 to compensate for the applied gain reduction, to ensure that the set of digital output data signals Y still reflects the same effective weighting and the same effective activation function regardless of the controlled gain applied in the input path. Thus, the gain control unit 540 may be operative to control an output gain applied by the ADC unit 530 and/or an output gain applied by the activation function unit 560 or a slope of a non-linear activation function applied by the activation function unit 560 so as to provide, in effect, a gain increase to the signals output by the plurality of dot product engines 510, to compensate for the gain reduction applied to the digital input data signals. In some embodiments a dedicated controllable digital output gain unit may be provided to apply the output gain to the output(s) of the ADC unit 530 or the activation function unit 560. The controllable digital output gain unit may be, for example, a binary shift unit operative to apply the output gain to the signal(s) output by the ADC unit 530 or the activation function unit 560 by performing one or more binary left shift operations.

For example the effective conversion gain of the ADC may be controlled by altering a value of a reference voltage or current used by the ADC, the analogue output may be scaled by an active or passive gain stage, or the digital output may be scaled by a digital multiplier. The term ADC should be understood to include the possibility that the ADC comprises a PWM modulator, whose gain may be controlled by the slew rate of an applied voltage ramp or current ramp or digital ramp reference waveform or by the frequency of a clock used to define the width of output pulses.

Where a different common gain may be applied to the digital input data signals for a different neuron, the gain applied in the output path between the dot product engine and the digital output Y of that different neuron will also be separately controlled to compensate for the different common gain of that different neuron.

In some circumstances a limited amount of saturation and clipping at the DACs of the DAC unit 520 may be acceptable. Thus, the gain control unit 540 may be configured to receive a tuning factor P that reflects an acceptable amount of saturation and clipping. For example, where the gain control unit 540 compares the input data signal values to the first threshold, the gain control unit 540 may be operative to adjust the first threshold based upon the tuning factor P. For example, for a particular application or operating mode of the ANN system 500 it may be acceptable if 5% of digital data input signal values cause clipping. A value of the tuning factor P may be selected to reflect this, and in response to receiving the tuning factor P the gain control unit 540 may adjust the first threshold such that 5% of digital input data signals give rise to clipped DAC outputs. For example, where the first threshold was previously selected to prevent any clipping, the gain control unit 540 may increase the first threshold in response to receiving the tuning factor P.

In some circumstances the dynamic range of the digital data signals for a neuron may be less than the input operating range of the DACs of the DAC unit 520. In such circumstances the gain control unit 540 may be operative to control the gain applied by the controllable gain unit 550 so as to increase the gain applied in the path to the input of the dot product engine, for example by applying a gain greater than 1 to those digital input data signals, such that the value of the gain adjusted signals output by the controllable gain unit 550 for that neuron occupies the whole of, or at least a larger portion of, the input operating range of the DACs of the DAC unit 520.

To this end, the gain control unit 540 may monitor the digital input data signals and if a digital input data signal having a small value, e.g. a value less than a second threshold, is detected, the gain control unit 540 may control the gain of the controllable digital gain element 550 and/or the DAC unit 520 so as to apply an increased gain, for example greater than 1, to the digital input data signals.

The gain control unit 540 in this example is operative to control the gain of the controllable digital gain element 550 and/or the DAC unit 520 so as to apply a common gain to all of the digital input data signals for a neuron of the ANN if the value of any of the digital input data signals is below the second threshold. It is to be understood that whilst a common gain is applied to all of the digital input data signals for a particular neuron, a different gain may be applied to the digital input data signals for a different neuron.

Where a different common gain may be applied to the digital input data signals for a different neuron, the gain applied in the output path between the dot product engine and the digital output Y of that different neuron will also be separately controlled to compensate for the different common gain of that different neuron.

Where a gain increase (e.g. a gain greater than 1) has been applied to the digital input data signals a corresponding gain reduction should be applied to the signals output by the plurality of dot product engines 510 to compensate for the applied gain increase, to ensure that the set of digital output data signals Y still reflects the same effective weighting and the same effective activation function regardless of the controlled gain applied in the input path. Thus, the gain control unit 540 may be operative to control gains applied by the ADC unit 530 and/or gains applied by the activation function unit 560 or a slope of a non-linear activation function applied by the activation function unit 560 and/or gains applied by any digital output gain unit that may be provided, so as to provide gain reductions to the signals output by the dot product engine(s) 510, to compensate for the gain increase applied to the digital input data signals.

In some circumstances the level of the analog dot product output signals may be greater than an input range of the plurality of ADCs, as a result of the multiplication and summation operations performed by the plurality of dot product engines 510. In such circumstances saturation of the ADC(s) of the ADC unit 530 will occur, leading to clipping of their output signals. Note that this saturation and clipping may occur even when a gain reduction has been applied to the digital input data signals, depending on the correlation between components of the input (digital input data signal) vector with respective components of the weight vector.

To prevent or at least reduce such clipping, the gain control unit 540 may monitor the analog dot product output signals received at the ADC unit 530 and/or the digital representations of those signals that are received by the activation function unit 560.

If a signal having a parameter indicative that clipping has occurred is detected, e.g. if the level of an analog signal received at the ADC unit 530, or the value of its digital representation as received at the activation function unit 560, meets or exceeds a third threshold, the gain control unit 540 may control the gain applied by the controllable gain unit 550 and/or the DAC unit 520 so as to reduce the gain applied in the path to the input of the dot product engine, for example by applying a gain of less than 1 to the digital input data signals, or to reduce further the gain applied to the digital input data signals, where a gain reduction has already been applied. In this way, the level of the analog dot product output signals may be reduced so as to be within the input range of the ADC(s) of the ADC unit 530.

In some embodiments a bias signal may be applied to the signal(s) input to the activation function unit 560. For example, a bias signal may be applied to the signal(s) output by the dot product engine(s) 510 or the ADC unit 530.

If an output gain is applied to the signal(s) input to the activation function unit 560 downstream of the bias signal (i.e. after the bias signal is applied), for example if the bias signal is applied to the signal(s) output by the dot product engine(s) 510 or the ADC unit 530 before an output gain has been applied by either the activation function unit 560 or a dedicated controllable digital output gain unit, then a gain corresponding to the input gain applied to the input digital data signals must be applied to the bias signal to compensate for the output gain that will subsequently be applied to the bias signal by the activation function unit 560 or the dedicated controllable digital output gain unit.

However, if an output gain is applied to the signal(s) input to the activation function unit 560 upstream of the bias signal (i.e. before the bias signal is applied), for example if the bias is applied to the signal(s) output by the ADC unit 530 after an output gain has been applied by either the ADC unit 530 or a dedicated controllable digital output gain unit, then no action need be taken to compensate for the added bias signal.

Figure 4:
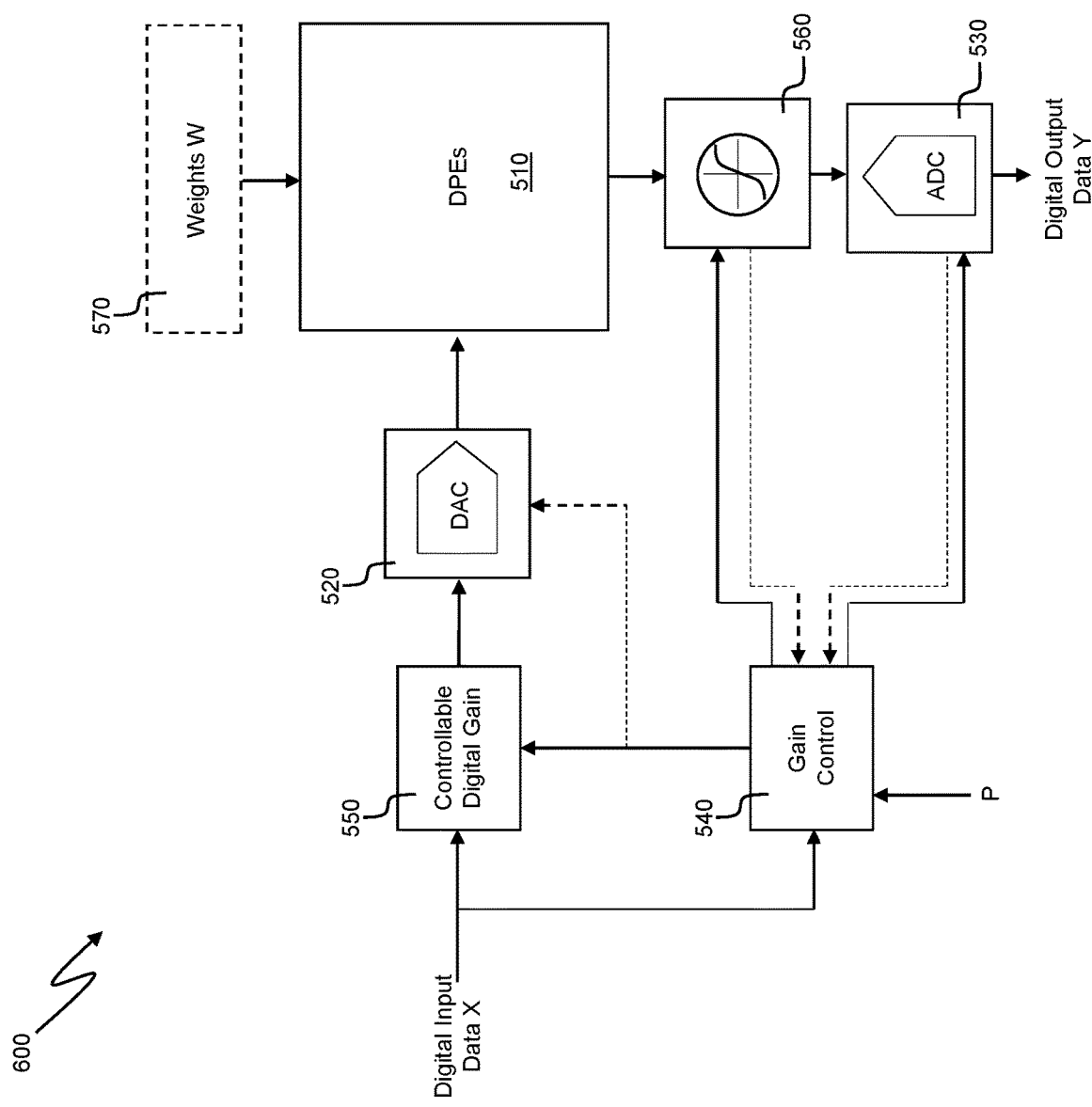
FIG. 4 is a schematic representation of a further alternative artificial neural network (ANN) system.

FIG. 4 is a schematic representation of an alternative ANN system that can implement scaling of digital data input values. The ANN system, shown generally at 600 in FIG. 4, has many features in common with the ANN system 500 of FIG. 3, and so like reference numerals in FIGS. 3 and 4 refer to like elements.

The ANN system 600 of FIG. 4 operates in a similar manner to the ANN system 500 of FIG. 3, and thus the description above is equally applicable to the ANN system 600. The ANN system 600 differs from the ANN system 500 only in that the ADC unit 530 is configured to receive the output(s) of the activation function unit 560 and to output a set Y of one or more digital ANN system output data signals. Thus, rather than converting the analog dot product output signals output by the plurality of dot product engines 510 into digital signals that are received by the activation function unit 560, as in the ANN system 500 of FIG. 3, in the ANN system 600 of FIG. 4 the activation function unit 560 receives the analog dot product output signals from the plurality of dot product engines 510 and performs analog non-linear activation functions on them, before outputting analog signals to ADC unit 530, which converts the analog signals output by the activation function unit 560 into the set Y of digital ANN system output signals.

In such a system, in order to make the transfer function from digital input data X to digital output data Y invariant to the controlled gain applied in the input path to the dot product engine, the controlled gain applied in the output path from the dot product engine output has to be performed either by modification of the non-linear activation function or by a gain element in the activation function block 560 that applies the gain before applying the application of the non-linearity.

The embodiments of FIGS. 3 and 4 each comprise a DAC unit 520, an ADC unit 530 and an activation function unit 560 which are separate from the dot-product engines 510. In other embodiments the function of the DAC unit 520, ADC unit 530 or activation function unit 560 may be embedded within the dot-product engine structure. For instance dot-product engine input data may be supplied as separate bits to respective rows of cross-point elements contributing appropriately to output columns whose outputs are binarily weighted, rather than ever producing a single analog output signal.

In further embodiments the input data X may be provided as a set of analog signals of variable amplitude, which data is preferably subjected to controlled analog gains, possibly on a per-neuron basis, to match the general level of input signals to the analog input signal range of an analog implementation of dot-product engines 510. The dot-product engine output signal for each neuron is then subjected to an inversely controlled gain to maintain the overall transfer function of the ANN system invariant to the applied input gain. The activation function may be implemented in analog circuitry and provide analog output data Y.

The term digital signal should be interpreted as encompassing digital signal formats such as ternary or other multi-level signals comprising waveforms where multiple different logic levels are defined in terms of non-overlapping physical signal ranges. Such a multi-level signal may also be represented by multiple binary-level signals in parallel or time-sequenced serially.

Figure 5:
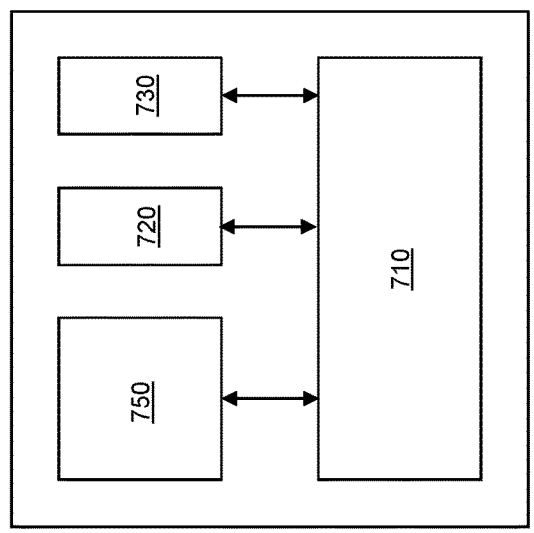
FIG. 5 is a schematic representation of a device and an ANN system of the kind illustrated in FIGS. 2-4.

FIG. 5 is a schematic representation of a device in which a processing system of the kind described above may be provided. The device, shown generally at 700 in FIG. 5, may be an edge device such as a mobile telephone, tablet or laptop computer, IoT device or the like. The device 700 includes a processing unit 710, embodied on one or more integrated circuits, which may be, for example, an application processor. The device further includes memory 720 communicatively coupled to the processing unit 710, and a communications subsystem 730 which is also communicatively coupled to the processing unit 710 to permit the device 700 to communicate with systems and devices external to the device 700. The device further includes an integrated circuit 750 that implements a neuron or ANN system 500, 600 of the kind described above with reference to FIGS. 3 and 4. The integrated circuit 750 is communicatively coupled to the processing unit 710 for receiving input data from and transmitting output data to the processing unit 710.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A neuron for an artificial neural network, the neuron comprising:
   a dot product engine operative to:
      receive a set of weights;
      receive a set of data inputs based on a set of input data signals; and
      calculate the dot product of the set of data inputs and the set of weights to generate a dot product engine output;
   an activation function module arranged to apply an activation function to a signal indicative of the dot product engine output to generate a neuron output;
   gain control circuitry operative to control:
      an input gain applied to the input data signals to generate the set of data inputs; and
      an output gain applied to the dot product engine output or by the activation function module;
      wherein the output gain is selected to compensate for the applied input gain; and
   a controllable input gain unit operative to receive the set of input data signals and to output the set of data inputs to the dot product engine, wherein the gain control circuitry is operative to control a gain of the controllable gain unit;
   wherein the dot product engine is an analog dot product engine and wherein the neuron further comprises a set of digital to analog converters (DACs), each DAC having an input coupled to an output of the controllable input gain unit and an input coupled to a data input terminal of the dot product engine.

2. A neuron according to claim 1 wherein the controllable input gain unit comprises a binary shift unit.

3. A neuron according to claim 1 wherein the gain control circuitry is operative to control a gain of the set of DACs.

4. A neuron according to claim 1 further comprising an analog to digital converter (ADC) coupled between an output of the dot product engine and an input of the activation function module.

5. A neuron according to claim 4 wherein the gain control circuitry is operative to control the input gain and the output gain based at least in part on the output of the ADC.

6. A neuron according to claim 5 wherein the gain control circuitry is operative to:
   compare the value of the output of the ADC to a third threshold; and
   if the value of the output of the ADC meets or exceeds the threshold:
      if no input gain has been applied to the one or more of the input data signals, apply an input gain reduction to one or more of the input data signals; or
      if an input gain has been applied to the one or more of the input data signals, reduce the value of the input gain applied to the one or more input data signals.

7. A neuron according to claim 1 wherein the activation function module is coupled to an output of the dot product engine, and wherein the neuron further comprises an analog to digital converter (ADC) coupled to an output of the activation function module.

8. A neuron according to claim 1 wherein the gain control circuitry is operative to control the input gain and the output gain based at least in part on a value of one or more of the input data signals.

9. A neuron according to claim 8 wherein the gain control circuitry is operative to:
   compare a value of an input data signal to a first threshold; and
   if the value of the input data signal meets or exceeds the threshold, apply an input gain reduction to one or more of the input data signals.

10. A neuron according to claim 8 wherein the gain control circuitry is operative to:
    compare a value of an input data signal to a second threshold; and if the value of the input data signal is below the second threshold, apply an input gain increase to one or more of the input data signals.

11. A neuron according to claim 1 wherein the gain control circuitry is operative to control the input gain and the output gain based at least in part on a value of the dot product engine output.

12. A neuron according to claim 11 wherein the gain control circuitry is operative to:
compare the value of the dot product engine output to a third threshold; and
if the value of the dot product engine output meets or exceeds the threshold:
if no input gain has been applied to the one or more of the input data signals, apply an input gain reduction to one or more of the input data signals; or
if an input gain has been applied to the one or more of the input data signals, reduce the value of the input gain applied to the one or more input data signals.

13. A neuron according to claim 1 wherein the gain control circuitry is operative to receive a tuning factor and to control the gain applied to each of the input data signals based in part on the received tuning factor.

14. A neuron according to claim 1 wherein the neuron is operative to apply a bias signal to the signal indicative of the dot product engine output, and to apply a gain corresponding to the input gain to the bias signal.

15. An integrated circuit comprising a neuron according to claim 1.

16. A device comprising an integrated circuit according to claim 15, wherein the device comprises a mobile telephone, a tablet or laptop computer or an Internet of Things (IoT) device.

17. A neuron for an artificial neural network, the neuron comprising:
a dot product engine operative to:
receive a set of weights;
receive a set of data inputs based on a set of input data signals;
calculate the dot product of the set of data inputs and the set of weights to generate a dot product engine output;
an activation function module arranged to apply an activation function to a signal indicative of the dot product engine output to generate a neuron output; and
a controllable input gain unit operative to apply an input gain to the input data signals to generate the set of data inputs;
wherein the activation function module is operative to apply an output gain, the output gain being selected to compensate for the applied input gain; and
wherein the dot product engine is an analog dot product engine and wherein the neuron further comprises a set of digital to analog converters (DACs), each DAC having an input coupled to an output of the controllable input gain unit and an input coupled to a data input terminal of the dot product engine.

18. An artificial neural network (ANN) system comprising a plurality of neurons, each neuron comprising:
a dot product engine operative to:
receive a set of weights;
receive a set of data inputs based on a set of input data signals; and
calculate the dot product of the set of data inputs and the set of weights to generate a dot product engine output;
an activation function module arranged to apply an activation function to a signal indicative of the dot product engine output to generate a neuron output;
wherein the ANN system further comprises gain control circuitry operative to control:
an input gain applied to a set of input data signals for a neuron to generate the set of data inputs for the dot product engine of that neuron; and
an output gain applied to the dot product engine output or by the activation function module of that neuron;
wherein the output gain is selected to compensate for the applied input gain; and
wherein each neuron further comprises a controllable input gain unit operative to receive the set of input data signals and to output the set of data inputs to the dot product engine, wherein the gain control circuitry is operative to control a gain of the controllable gain unit; and
wherein the dot product engine is an analog dot product engine and wherein the neuron further comprises a set of digital to analog converters (DACs), each DAC having an input coupled to an output of the controllable input gain unit and an input coupled to a data input terminal of the dot product engine.

19. An integrated circuit comprising an ANN system according to claim 18.

* * * * *